US012510396B2

(12) United States Patent
Oßwald et al.

(10) Patent No.: US 12,510,396 B2
(45) Date of Patent: Dec. 30, 2025

(54) LEVEL MEASURING DEVICE

(71) Applicant: Endress+Hauser SE+Co. KG, Maulburg (DE)

(72) Inventors: Dirk Oßwald, Schopfheim (DE); Eric Bergmann, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 330 days.

(21) Appl. No.: 18/256,969

(22) PCT Filed: Nov. 26, 2021

(86) PCT No.: PCT/EP2021/083095
§ 371 (c)(1),
(2) Date: Jun. 12, 2023

(87) PCT Pub. No.: WO2022/122407
PCT Pub. Date: Jun. 16, 2022

(65) Prior Publication Data
US 2024/0053185 A1 Feb. 15, 2024

(30) Foreign Application Priority Data

Dec. 11, 2020 (DE) ...................... 10 2020 133 194.0

(51) Int. Cl.
*G01F 23/284* (2006.01)
*G01S 7/02* (2006.01)
*G01S 7/03* (2006.01)
*G01S 13/08* (2006.01)
*G01S 13/88* (2006.01)
*H01P 1/04* (2006.01)
*H01P 5/02* (2006.01)
*H01Q 1/22* (2006.01)

(52) U.S. Cl.
CPC ............ *G01F 23/284* (2013.01); *G01S 7/027* (2021.05); *G01S 7/03* (2013.01); *G01S 13/08* (2013.01);
(Continued)

(58) Field of Classification Search
CPC .......... G01F 23/284; G01S 7/027; G01S 7/03; G01S 13/08; G01S 13/88; H01P 1/042; H01P 5/024; H01Q 1/225
(Continued)

(56) References Cited

U.S. PATENT DOCUMENTS

| 5,955,684 A | 9/1999 | Gravel et al. |
| 2004/0079152 A1* | 4/2004 | Sorenson ................ G01F 23/38 |
| | | 702/45 |

(Continued)

FOREIGN PATENT DOCUMENTS

| CN | 101287970 A | 10/2008 |
| CN | 103245395 A | 8/2013 |

(Continued)

*Primary Examiner* — William Kelleher
*Assistant Examiner* — Samarina Makhdoom
(74) *Attorney, Agent, or Firm* — Mark A. Logan; Endress+Hauser (USA) Holding, Inc.

(57) ABSTRACT

A modular radar level measuring device which can be designed to be compact includes a high-frequency module biased according to the invention within the device housing by a spring element in such a way that the waveguide segment of the high-frequency module is pressed with a corresponding force against the corresponding high-frequency connection of the antenna arrangement. This ensures a gap-free and thus low-interference connection of the high-frequency module to the antenna arrangement via the waveguide segments. This simplifies the modular design of the level measuring device. In this case, the level measuring device can be designed to be very compact, especially if the high-frequency module is housed in the measuring device neck of the device housing toward the antenna arrangement.

9 Claims, 3 Drawing Sheets

(52) U.S. Cl.
CPC .............. *G01S 13/88* (2013.01); *H01P 1/042* (2013.01); *H01P 5/024* (2013.01); *H01Q 1/225* (2013.01)

(58) Field of Classification Search
USPC ........................................................ 342/124
See application file for complete search history.

(56) References Cited

U.S. PATENT DOCUMENTS

| | | | | |
|---|---|---|---|---|
| 2005/0083228 | A1* | 4/2005 | Edvardsson | G01S 7/03 342/124 |
| 2009/0262009 | A1* | 10/2009 | Kienzle | G01F 23/284 342/124 |
| 2016/0202347 | A1* | 7/2016 | Malinovskiy | G01S 13/88 342/124 |
| 2017/0141474 | A1* | 5/2017 | Hengstler | H01Q 1/125 |
| 2018/0113020 | A1* | 4/2018 | Fredriksson | G01F 23/284 |
| 2019/0331518 | A1* | 10/2019 | Ohlsson | G01F 23/284 |

FOREIGN PATENT DOCUMENTS

| | | |
|---|---|---|
| CN | 110268232 A | 9/2019 |
| CN | 212206274 U | 12/2020 |
| DE | 10242500 A1 | 3/2004 |
| DE | 20319489 U1 | 5/2004 |
| EP | 2487472 A2 | 8/2012 |
| WO | 2020120059 A1 | 6/2020 |
| WO | 2020160777 A1 | 8/2020 |

* cited by examiner

LEVEL MEASURING DEVICE

CROSS-REFERENCE TO RELATED APPLICATIONS

The present application is related to and claims the priority benefit of DPMA Patent Application No. 10 2020 133 194.0, filed on Dec. 11, 2020, and International Patent Application No. PCT/EP2021/083095, filed Nov. 26, 2021, the entire contents of which are incorporated herein by reference.

TECHNICAL FIELD

Background

In process automation, corresponding field devices are used for capturing relevant process parameters. For the purpose of capturing the respective process parameters, suitable measuring principles are therefore implemented in the corresponding field devices in order to capture, for example, a fill level, a flow, a pressure, a temperature, a pH value, a redox potential or a conductivity as process parameters. A wide variety of such field devices is manufactured and distributed by the Endress+Hauser company.

For measuring the fill level of filling materials in containers, contactless measuring methods have become established, because they are robust and require minimum maintenance. A further advantage of contactless measuring methods consists in the ability to be able to measure the fill level quasi-continuously. Radar-based measuring methods are therefore predominantly used in the field of continuous fill-level measurement (in the context of this patent application, the term "radar" refers to signals or electromagnetic waves with frequencies between 0.03 GHz and 300 GHz). An established measurement method is FMCW ("frequency-modulated continuous wave"). The FMCW-based fill-level measuring method is described, for example, in published patent application DE 10 2013 108 490 A1.

In principle, the antenna arrangement of radar-based level measuring devices is to be attached with direct contact to the container interior since no barrier that is impermeable to radar signals may be present between the antenna arrangement and the filling material. In contrast, the electronic modules of the level measuring device, such as the radar-specific high-frequency module for high-frequency signal generation, and further units for data processing and data transmission are accommodated outside the container in a separate device housing. This is because, primarily for explosion protection purposes, a spatial separation between the active modules, i.e., energized modules, and the passive antenna arrangement is often required. For this purpose, the device housing comprises a measuring device neck, via which the antenna arrangement is mechanically connected to the device housing. In this case, a corresponding explosion protection barrier toward the antenna arrangement is arranged in the measuring device neck. In addition or as an alternative to explosion protection requirements, the measuring device neck may have to fulfill further protective functions: Depending on the application, high temperatures, high pressure or hazardous gases prevail inside the container. Depending on the application, the measuring device neck must therefore function as a pressure seal, temperature barrier, and/or as a media seal.

So that the device housing and the (interface) modules located therein can serve not only in the level measuring devices but also as a platform for further field devices types, and so that the device housing can be designed to be more compact overall, the high-frequency module specific to radar-based level measuring devices can be housed in the measuring device neck. However, the spatial conditions in the measuring device neck are extremely limited due to thermal and explosion protection-specific requirements. For this reason, it is difficult to accommodate the radar-specific high-frequency module in the measuring device neck. Especially in the case of a modular design, the connection of the high-frequency module to the antenna arrangement is also challenging since the connection must be designed to be releasable and any plug connections between the corresponding waveguide segments increase the risk of high-frequency disturbances.

SUMMARY

The object of the invention is therefore to provide a compact and modular level measuring device.

The invention achieves this object by means of a radar-based level measuring device which serves to determine a fill level in a container and comprises the following components:
- an antenna arrangement that can be controlled via a high-frequency connection and by means of which a radar signal can in each case be sent toward a filling material, and by means of which a corresponding receive signal can in each case be received after reflection of the radar signal on the filling material surface,
- a high-frequency module comprising
    - a transmitting/receiving unit, which is designed to generate the radar signal according to a defined measuring principle and to determine the fill level on the basis of the corresponding receive signal according to the implemented measuring principle after reflection of the radar signal on the filling material surface, furthermore comprising
    - an electronics encapsulation, in which the transmitting/receiving unit is arranged, so that the transmitting/receiving unit and the second waveguide segment can be enclosed for the purpose of explosion protection within the electronics encapsulation by means of a potting up to the feed-through, and comprising
    - a second waveguide segment, which is connected, for the transmission of the radar signals, to the transmitting/receiving unit in such a way that the second waveguide segment is guided out of the electronics encapsulation,
- a device housing which is adjacent to the antenna arrangement and in which the high-frequency module is arranged, or in the measuring device neck of which the high-frequency module is arranged, and
- a spring element which biases the high-frequency module or the electronics encapsulation against the device housing or the measuring device neck in such a way that the second waveguide segment guided out is pressed against the high-frequency connection with a corresponding force in the direction of a common waveguide axis.

The spring element according to the invention ensures a gap-free and thus low-interference connection of the high-frequency module to the antenna arrangement via the waveguide segment or the corresponding high-frequency connection, as a result of which the modular design of the level measuring device is simplified. In this case, the HF interference susceptibility is reduced by the pressing, especially if the high-frequency connection and the waveguide segment are designed as hollow conductors. In this case, the principle according to the invention of pressing the waveguide segment can also be applied if, for electrically decoupling the antenna arrangement, a bilaterally form-fitting, galvanic separation is arranged between the high-frequency connection and the waveguide segment.

The pressing according to the invention of the electronics module has an advantageous effect, especially if the device housing comprises a measuring device neck as a thermal decoupling toward the antenna arrangement. In this case, the high-frequency module to be connected to the antenna arrangement can be arranged, under the bias according to the invention, in the measuring device neck. On the one hand, this saves space in the actual device housing. On the other hand, this design minimizes the length of the high-frequency path between the antenna arrangement and the high-frequency module so that the HF interference susceptibility within the scope of the fill-level measurement is thereby further reduced.

In the sense of the invention, it is not fixedly specified whether the high-frequency module or its waveguide segment is pressed against the high-frequency connection under pressure or under tension by the spring element. Accordingly, the spring element can be designed both as a pressure spring and as a tension spring. If the spring element is designed as a pressure spring, the pressure spring is to be arranged, for biasing the high-frequency module within the device housing or within the measuring device neck, on an outer side of the electronics encapsulation opposite the waveguide segment. If the spring element is designed as a tension spring, the tension spring is to be arranged, for biasing the high-frequency module within the device housing or within the measuring device neck, on an outer side of the electronics encapsulation facing the waveguide segment. Depending on the design, the spring element can thus be designed, for example, as one or more wave spring(s), spiral spring(s) or as disk spring(s).

So that the high-frequency module can be inserted simply and securely into the device housing or into the measuring device neck during manufacture, it is possible to design the level measuring device with at least one such guide element so that the high-frequency module is guided within the device housing or within the measuring device neck along the common waveguide axis of the high-frequency connection or of the waveguide segment. This ensures that the waveguide segment is docked to the high-frequency connection in a precise fit during installation.

The terms "unit" or "module" within the scope of the invention, is in principle understood to mean any electronic circuit that is suitably designed for the intended purpose, for example for high-frequency generation or as an interface. Depending on the requirement, the corresponding unit may thus be an analog circuit for generating or processing corresponding analog signals. However, the unit may also be a digital circuit, such as an FPGA, or a storage medium in interaction with a program. In this case, the program is designed to perform the corresponding method steps or to apply the necessary calculation operations of the respective unit. In this context, various electronic units or modules of the measuring device in the sense of the invention can potentially also access a common physical memory or be operated by means of the same physical digital circuit. Specifically, the transmitting/receiving unit for controlling the antenna arrangement via the waveguides can be based, for example, on the FMCW method or the pulse transit-time method.

BRIEF DESCRIPTION OF THE DRAWINGS

The invention is explained in more detail with reference to the following figures. In the figures.

DETAILED DESCRIPTION

Figure 1:
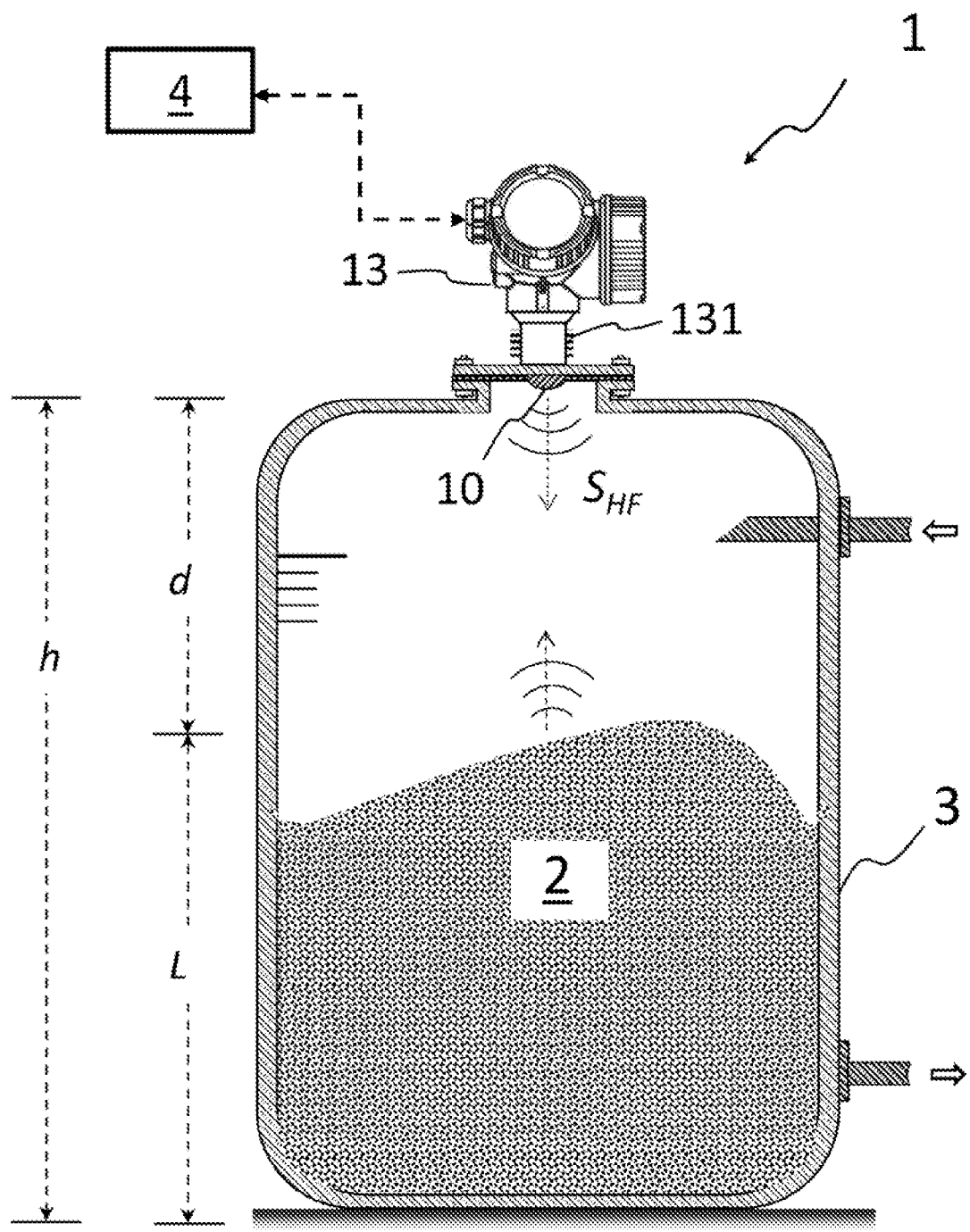
FIG. 1 shows a radar-based level measuring device on a container.

For the basic understanding of radar-based fill-level measurement, FIG. 1 shows a container 3 with a filling material 2, the fill level L of which is to be determined. Depending on the type of filling material 2 and depending on the field of application, the container 3 can be up to more than 100 m high. The conditions in the container 3 also depend on the type of filling material 2 and the field of application. For example, in the case of exothermic reactions, high temperature and pressure load can occur. In the case of dust-containing or flammable substances, corresponding explosion protection conditions must be maintained in the container interior.

Figure 2:
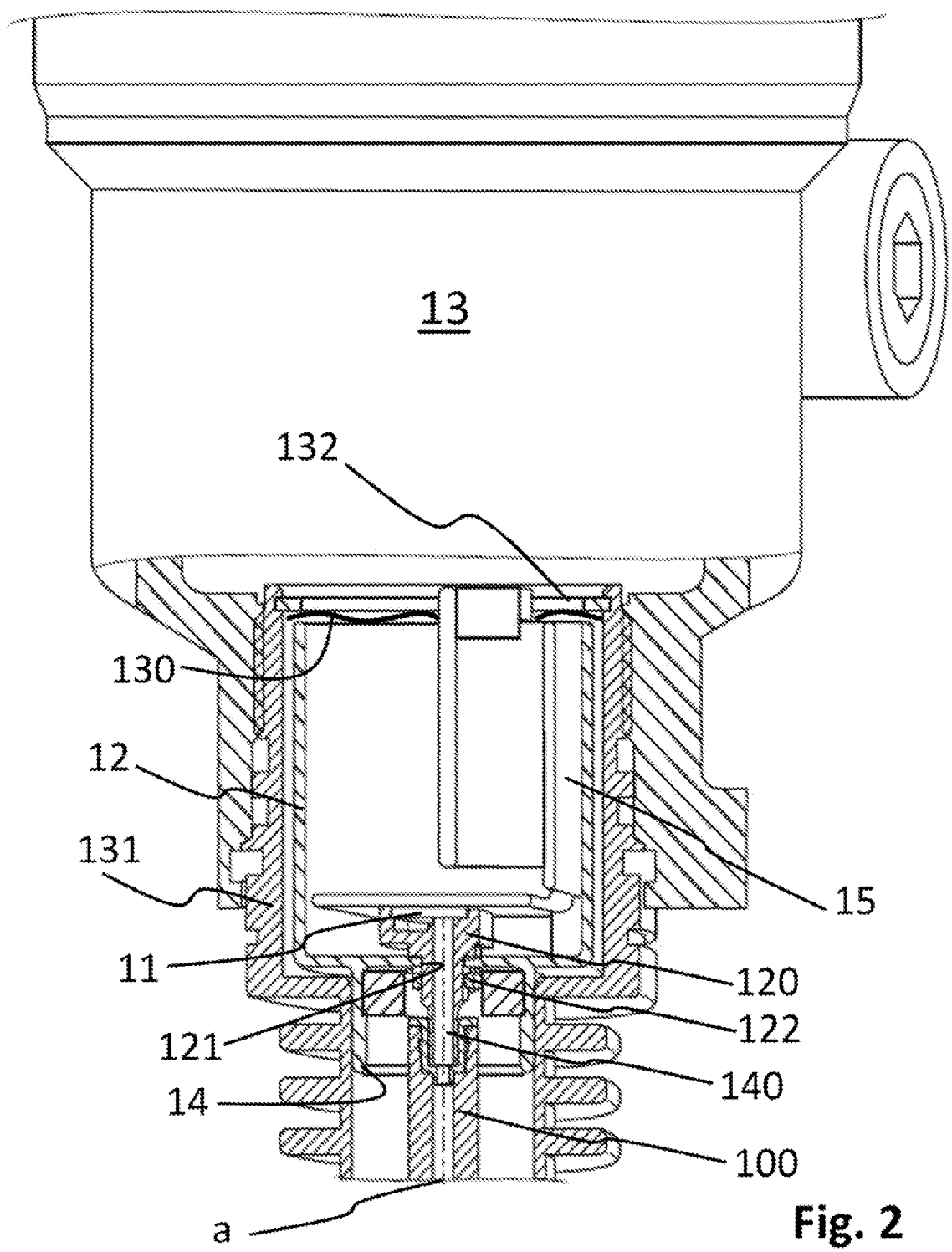
FIG. 2 shows a cross-sectional view of a level measuring device according to the present disclosure.

In order to be able to ascertain the fill level L independently of the prevailing conditions, a radar-based level measuring device 1 is attached to the container 3 at a known installation height h above the filling material 2. In this case, the level measuring device 1 is fastened to a corresponding (flange) opening of the container 3 or aligned in such a way that an antenna arrangement 10 of the level measuring device 1 is directed vertically into the container 3 and toward the filling material 2. The remaining device housing 13 of the level measuring device 1, in which the electronic components 11 are accommodated, is arranged outside the container feed-through. Due to the spatial separation of the electronic components 11 in the device housing 13 from the antenna arrangement 10 or from the container interior by a measuring device neck 131, explosion protection within the container 3 is ensured on the one hand. On the other hand, the electronic components 10 in the device housing 13 or in the measuring device neck 131 are protected from temperature and pressure load from the container interior. As indicated in FIG. 1 and FIG. 2, the measuring device neck 131 has corresponding cooling ribs for thermally decoupling the device housing 13.

As a result of the arrangement on the container 3, it is possible for the level measuring device 1 to vertically send radar signals $S_{HF}$ via the antenna arrangement 10 in the direction of the surface of the filling material 2. After reflection on the filling material surface, the level measuring device 1 receives the reflected radar signals $R_{HF}$ again via the antenna arrangement 10. In this case, the signal transit time between sending and receiving the respective radar signal $S_{HF}$, $R_{HF}$ is proportional to the distance d between the level measuring device 1 and the filling material 2, wherein the signal transit time can, for example, be determined by the level measuring device 1 by means of the FMCW method or by means of the pulse transit-time method. Accordingly, the level measuring device 1 can, for example, assign the measured transit time to the respective distance d on the basis of a corresponding calibration. In this way, the level measuring device 1 can again determine the fill level L according to $$d = h - L$$

provided the installation height h is stored in the level measuring device 1.

As a rule, the level measuring device 1 is connected via an interface module, such as "PROFIBUS," "HART" or "Wireless HART," accommodated in the device housing 13, to a superordinate unit 4, such as a process control system. In this way, the fill-level value L can be transmitted, for example in order to control the inflows or outflows of the container 3 if necessary. However, other information about the general operating state of the level measuring device 1 can also be communicated.

As sketched in FIG. 2, the antenna arrangement 10 within the level measuring device 1 is controlled by a high-frequency module 11, 12, 120 through high-frequency technology. In a correspondingly designed transmitting/receiving unit 11 of the high-frequency module 11, 12, 120, the FMCW method or pulse transit-time measuring principle is, for example, implemented for determining the signal transit time on the basis of the incoming receive signal $R_{HF}$. In addition, the transmitting/receiving unit 11 serves to generate the radar signal $S_{HF}$ to be sent. For this purpose, in the embodiment variant shown, the transmitting/receiving unit 11 is arranged within the measuring device neck 131, for example as a monolithically encapsulated SMD component, on a side of a circuit board facing the antenna arrangement 10.

The circuit board together with the transmitting/receiving unit 11 is enclosed by an electronics encapsulation 12 of the high-frequency module 11, 12, 120. The electronics encapsulation 12 can be manufactured from a plastic, such as PC, PE, PP or PA. On the one hand, this makes it possible to additionally encapsulate the circuit board together with the transmitting/receiving unit 11 by means of a potting compound for explosion protection purposes (not explicitly shown in FIG. 2). On the other hand, the coupling according to the invention of the transmitting/receiving unit 11 to the antenna arrangement 10 is made possible by means of the high-frequency module 11, 12, 120. For this purpose, in the embodiment variant shown in FIG. 2, the antenna arrangement comprises a straight hollow-conductor segment 100 as a high-frequency connection 100, via which the antenna arrangement 10 can be contacted by the high-frequency module 11, 12, 120 through high-frequency technology.

In order to transmit the radar signals $S_{HF}$, $R_{HF}$ from or to the transmitting/receiving unit 11, a likewise straight hollow-conductor segment 120, which, in the fully assembled state of the level measuring device 1, extends orthogonally, in relation to the circuit board, from the transmitting/receiving unit 11 toward the high-frequency connection 100, is assigned to the high-frequency module 11, 12, 120. The hollow-conductor segment 120 is in this case fastened via a screw connection 122 to a feed-through 121 of the electronics encapsulation 12 in such a way that the hollow-conductor segment 120 is guided through the wall of the electronics encapsulation 12 to the outside. For this purpose, the hollow-conductor segment 120 has, around the cavity, an external thread aligned in the hollow-conductor axis a so that the hollow-conductor segment 120 is tightened by a corresponding nut from the outside against the electronics encapsulation 12, as is the case in FIG. 2. Instead of the screw connection 122 shown in FIG. 2, the hollow-conductor segment 120 can also be fastened accordingly to the feed-through of the electronics encapsulation 12 with an alternative fastening, for example by means of pins.

Moreover, the circuit board, on which the transmitting/receiving unit 11 is arranged within the electronics encapsulation 12, is mounted on the hollow-conductor segment 120 by means of at least one fastening means. In this case, the fastening means can be an adhesive connection or again a pin or screw connection. As a result, the circuit board or the transmitting/receiving unit 11 is self-supporting within the electronics encapsulation 12. That is to say, as a result of the indirect fixing via the hollow-conductor segment 120, the transmitting/receiving unit 11 does not need to be directly fixed to the electronics encapsulation 12. As a result, the circuit board and thus the electronics encapsulation 12 can be designed to be very compact overall so that the accommodation of the high-frequency module 11, 12, 120 in the measuring device neck 131 is simplified.

As shown in FIG. 2, in addition to the transmitting/receiving unit 11, further circuit boards 15 can also be arranged within the electronics encapsulation 12 of the high-frequency module 11, 12, 120. As shown in the illustration, these further circuit boards can be electrically connected by means of a mechanically flexible cable harness, for example, to the circuit board on which the transmitting/receiving unit 11 is arranged. In this case, for manufacturing the high-frequency module 11, 12, 120, the transmitting/receiving unit 11 and any further circuit boards 15 can be inserted by means of an assembly aid designed as a negative form of the transmitting/receiving unit 11 or the further circuit boards 15, for example, from a side of the electronics encapsulation 12 facing away from the feed-through 121.

In the assembled state, i.e., as soon as the high-frequency module 11, 12, 120 is inserted into the measuring device neck 131, the high-frequency connection 100 designed as a hollow conductor and the hollow-conductor segment 120 of the high-frequency module 11, 12, 120 are adjacent to one another in such a precise fit (or the high-frequency connection 100 and the hollow-conductor segment 120 are respectively adjacent to a galvanic separation 140 arranged between them in such a precise fit) that the hollow-conductor segments 100, 120 form a common hollow-conductor axis a. As a result, lossless transmission of the radar signals $S_{HF}$ between the antenna arrangement 10 and the transmitting/receiving unit 11 is achieved. Accordingly, in the embodiment variant shown in FIG. 2, the high-frequency module 11, 12, 120 is designed such that during insertion into the measuring device neck 131, the electronics encapsulation 12 is guided accordingly (from the end region that faces away from the antenna arrangement 10) in the direction of the hollow-conductor axis a of the hollow-conductor segments 100, 120. For this purpose, in the extension to the electronics encapsulation 12, corresponding to the inner wall of the measuring device neck 131, a corresponding guide element 14 is formed in this region radially symmetrically around the second hollow-conductor segment 120.

The optional galvanic separation 140 made of plastic or ceramic and shown in FIG. 2 serves to electrically decouple the antenna arrangement 10 from the transmitting/receiving unit 11 or from the further electronic components in the device housing 13. For this purpose, the galvanic separation 140 is arranged in a precise fit between the high-frequency connection 100 and the hollow-conductor segment 120, wherein the galvanic separation 140 is made of an electrically insulating material, such as a ceramic or a plastic, and has a feed-through corresponding to the internal cross-section of the hollow conductors 100, 120.

So that the high-frequency connection 100 of the antenna arrangement 10 and the hollow-conductor segment 120 of the high-frequency module 1, 12, 120 in the inserted state of the electronics encapsulation 12 are adjacent to one another or to the galvanic separation 140 without gaps, a spring element 130 presses, according to the invention, the electronics encapsulation under the guidance of the guide element 14 from inside the measuring device neck 131 toward the antenna arrangement 10 in such a way that the hollow-conductor segment 120 is pressed with the corresponding spring force against the hollow-conductor of the high-frequency connection 100. This in turn ensures lossless signal transmission. In the embodiment variant shown in FIG. 2, the spring element 130 is designed as a wave spring. In this case, the wave spring 130 is clamped inside the measuring device neck 131 between a groove or a locking ring 132 and that outer side of the electronics encapsulation 12 that faces away from the hollow-conductor segment 120.

Figure 3:
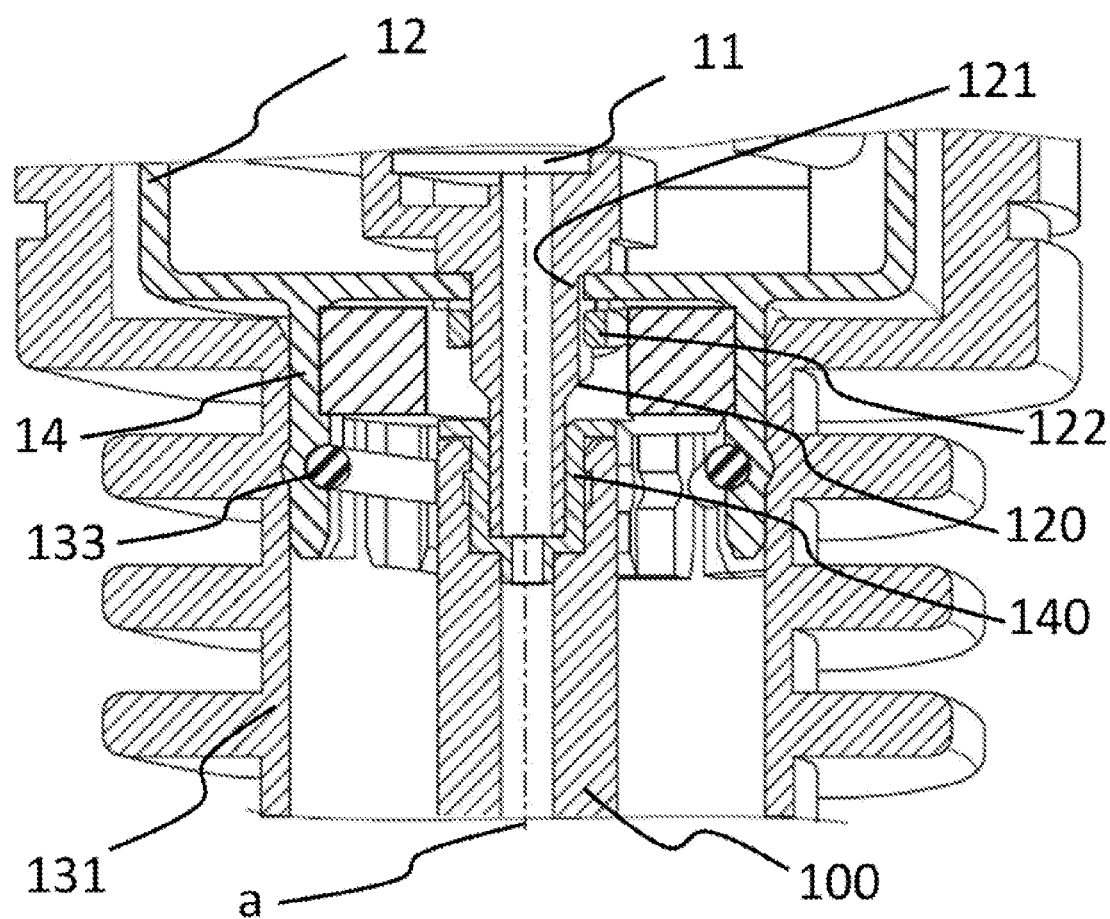
FIG. 3 shows a detail view of the level measuring device in the region of the waveguide segment.

In contrast to the embodiment variant shown in FIG. 2, it is alternatively also conceivable to design the spring element 130, 133 as a tension spring 133 and to clamp it in the device neck 131 between the antenna arrangement 10 and the electronics encapsulation 12 in order to pull the second waveguide segment 120 in turn with the corresponding spring force against the first waveguide segment 100. Such a possibility for the fixing according to the invention of the high-frequency module 11, 12, 120 is illustrated in FIG. 3: In the embodiment shown there, a spring ring 133 is provided on the outside of the electronics encapsulation 12 at the level of the hollow-conductor segment 120. In this case, the spring ring 133 is designed to press, in the state of the high-frequency module 11, 12, 120 inserted in the measuring device neck 131, from the inside against the guide element 14 of the electronics encapsulation 12 in such a way that an annular outer bead of the guide element 14 engages outward in a corresponding groove of the measuring device neck 131. In this case, the positions of the spring ring 133, of the outer bead and of the groove are selected to be so far down that the hollow-conductor segment 120 is in turn pressed, with a defined tensile stress and without gaps, against the high-frequency connection 100 of the antenna arrangement 10.

Regardless of the design of the spring element 130, 133 as a tension spring 133 or as a pressure spring 130, in addition to the gap-free sealing between the hollow conductors 100, 120, the clamping also causes the electronics encapsulation 12 to be fixed within the measuring device neck 12. In this context, the pressing according to the invention of the hollow-conductor segment 120 against the high-frequency connection 100 can also be implemented if the electronics encapsulation 12 is accommodated directly in the device housing 13. This can be the case if the device housing 13 of the level measuring device 1 does not comprise a measuring device neck 131 or if the hollow-conductor-shaped high-frequency connection 100 extends through the entire measuring device neck 131. In addition, the pressing according to the invention of the individual hollow-conductor segments 100, 120 can also be implemented if they are not designed as hollow conductors but, for example, as dielectric waveguides.

The invention claimed is:

1. A radar-based level measuring device for determining a fill level of a filling material, comprising:
   an antenna arrangement including a high-frequency connection,
      wherein the high-frequency connection is embodied as a straight hollow-conductor segment,
      wherein via the antenna arrangement a radar signal can be sent toward the filling material, and
      wherein via the antenna arrangement a receive signal can be received after reflection of the radar signal on a filling material surface;
   a high-frequency module, including:
      a transmitting/receiving unit which is designed to generate the radar signal and, after the reflection thereof on the filling material surface, to determine the fill level on the basis of the corresponding receive signal;
      an electronics encapsulation in which the transmitting/receiving unit is arranged; and
      a waveguide segment which is connected, for the transmission of the radar signals, to the transmitting/receiving unit and which extends therefrom out of the electronics encapsulation;
   a device housing which is connected to the antenna arrangement and its high-frequency connection, wherein the high-frequency module is arranged in the device housing such that an axis of the waveguide segment is coincident with an axis of the high-frequency connection; and
   a spring element via which the high-frequency module is biased against the device housing such that the waveguide segment is pressed against the high-frequency connection of the antenna arrangement with a corresponding force in a direction of the common waveguide and high-frequency connection axes.

2. The level measuring device according to claim 1, wherein the spring element is designed as a pressure spring which is arranged, for biasing the high frequency module, within the device housing on an outside of the electronics encapsulation opposite the waveguide segment.

3. The level measuring device according to claim 1, wherein the spring element is designed as a tension spring which is arranged, for biasing the high frequency module, within the device housing on an outside of the electronics encapsulation facing the waveguide segment.

4. The level measuring device according to claim 1, wherein the spring element is designed as a wave spring, a spiral spring, a disk spring, and/or a spring ring.

5. The level measuring device according to claim 1, wherein the device housing is connected to the antenna arrangement via a measuring device neck in which the high frequency module is arranged.

6. The level measuring device according to claim 1, wherein at least the transmitting/receiving unit is potted within the electronics encapsulation with a potting.

7. The level measuring device according to claim 1, further comprising:
   at least one guide element which is designed to guide the high-frequency module within the device housing or within the measuring device neck along the common waveguide axis (a).

8. The level measuring device according to claim 1, wherein the high-frequency connection and the waveguide segment are designed as hollow conductors.

9. The level measuring device according to claim 8, further comprising:
   a bilaterally form-fitting, galvanic separation arranged between the high-frequency connection and the waveguide segment.

* * * * *